Patented Nov. 25, 1930

1,783,084

UNITED STATES PATENT OFFICE

HANS GUBLER, OF BASEL, SWITZERLAND, ASSIGNOR TO THE FIRM SOCIETY OF CHEMICAL INDUSTRY IN BASLE, OF BASEL, SWITZERLAND

DYESTUFFS CONTAINING METALS AND PROCESS OF MAKING SAME

No Drawing. Application filed July 9, 1929, Serial No. 377,069, and in Switzerland July 14, 1928.

The present invention relates to new dyestuffs containing metals. It comprises the new products, the method of producing same in substance, in the dye-bath, or on the fiber, the application thereof and the material which has been dyed with the new products.

It has been found that the new dyestuffs containing complex bound metals which correspond to azo-dyestuffs of the general formula

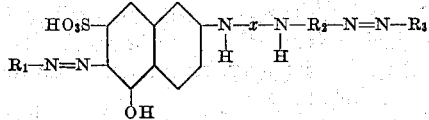

wherein $x$ stands for an organic residue containing at least one carbon atom, the $$-\underset{H}{N}-$$

groups being linked to such carbon atoms of said residue which are united by a double bond with a nitrogen, oxygen or sulfur atom, and wherein $R_1$ means the residue of a benzene nucleus characterized by the presence of a COOR-group (R=H or alkyl) standing in ortho-position to the —N=N— group, $R_2$ is an aryl nucleus, and $R_3$ an aryl nucleus which carries a carboxyl group and a OH-group standing in ortho-position to each other, are very valuable cotton dyestuffs which yield on the vegetable fiber, as well as on artificial fibers of the group of the regenerated cellulose, such as viscose or cuprammonium silk tints, particularly orange to brown, red, Bordeaux and brown, which may be distinguished by an excellent fastness to light.

As metals which are capable of forming complex compounds come first of all into question: copper, cobalt, nickel; further aluminium, vanadium, chromium, titanium, manganese, iron, molybdenum, cerium, uranium.

These dyestuffs are most conveniently obtained by combining intermediate products of the general formula

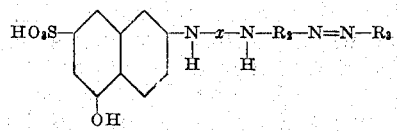

wherein $x$, $R_2$ and $R_3$ have the same meaning as above stated, with diazo-compounds containing in ortho-position to the —N=N— group a COOH- or COO-alkyl group; such products are for example the anthranilic acids, the anthranilic acid esters, the sulfo-anthranilic acids, the nitro- or chloro-anthranilic acids, the 2-aminonaphthalene-3-carboxylic acids, and the like. The disazo-dyestuffs thus obtained are then treated with agents yielding copper, chromium, manganese, etc., which operation may be performed in substance, in the dye-bath or on the fiber.

The same dyestuffs may be obtained by uniting 1 molecular proportion of an azo-dyestuff of the general formula

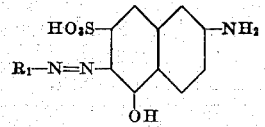

in which $R_1$ has the same meaning as above stated, and 1 molecular proportion of an azo-dyestuff of the general formula

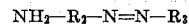

$$NH_2-R_2-N=N-R_3$$

wherein $R_2$ and $R_3$ have the same meaning as above stated, with compounds corresponding to the residue $x$ already described hereinbefore, i. e. inter alia phosgene, carbon disulfide, thiophosgene, triazine compounds having at least 2 halogen atoms capable of reacting, quinazolines or pyridazines halogenated at least twice in the heterocyclic nucleus, trichloropyrimidines, chloromethylpyrimidines, and the like.

The disazo-dyestuffs thus obtained are then treated with metallizing agents, such as salts, oxides or hydroxides of the metals above named.

It is also possible to metallize the single azo-dyestuffs separately and then combine same by means of compounds which correspond to the residue $x$.

The following examples illustrate the invention, the parts being by weight:—

*Example 1*

52.7 parts of the unsymmetrical urea of one molecular proportion of 2-amino-5-hydroxynaphthalene-7-sulfonic acid and one molecular proportion of 4'-amino-azobenzene-4-hydroxy-3-carboxylic acid are suspended in the form of the sodium salt in 400 parts of water and the suspension is stirred with 14 parts of caustic soda solution of 30 per cent. strength and 20 parts of calcined sodium carbonate. While stirring at 10–12° C. the diazo-solution from 21.6 parts of 1-amino-4-sulfobenzene-2-carboxylic acid is added and when coupling is complete the dyestuff is isolated in the usual manner. It dyes cotton orange tints, which by after-treatment with copper salts, change towards brown, with chromium and manganese salts slightly towards brown-red, with iron salts towards dark brown, with nickel salts towards light brown and with cobalt salts towards olive-tinged brown.

The manufacture of one of these compounds, for instance the copper compound, is conducted as follows:—The isolated dyestuff obtained according to the foregoing paragraph is stirred at 10–12° C. The diazo-solution from 21.6 parts of 1-amino-4-sulfobenzene-2-carboxylic acid is then added. When coupling is complete it is stirred in 1500 parts of water, heated to 60° C., acidified with dilute sulfuric acid and mixed with 60 parts of crystallized copper sulfate in the form of a solution of 20 per cent. strength; the whole is stirred for 2–3 hours at 80–85° C. and the copper compound, which has completely separated, is filtered. The dyestuff acid is stirred with dilute sodium carbonate solution and the sodium salt thus produced is salted out by means of common salt. The dyestuff dyes cotton yellow-brown tints of excellent fastness to light.

*Example 2*

66.4 parts of the tertiary condensation product from 1 molecular proportion of cyanuric chloride, 1 molecular proportion of 2-amino-5-hydroxynaphthalene-7-sulfonic acid, 1 molecular proportion of 4'-amino-azobenzene-4-hydroxy-3-carboxylic acid and 1 molecular proportion of aniline are suspended, with addition of 30 parts of sodium carbonate, in 600 parts of water, whereupon the whole is mixed with 14 parts of caustic soda solution of 30 per cent. strength and 20 parts of sodium carbonate. While stirring at 10–12° C. the diazo-solution from 21.6 parts of 1-amino-4-sulfobenzene-2-carboxylic acid is added and when coupling is complete the dyestuff is isolated in the usual manner; it is stirred in 1500 parts of water, heated to 60° C., acidified with dilute sulfuric acid and mixed with 60 parts of crystallized copper sulfate in the form of a solution of 20 per cent. strength; the whole is stirred for 2–3 hours at 80–85° C. and the copper compound, which has completely separated, is filtered. The dyestuff acid is stirred with dilute sodium carbonate solution and the sodium salt thus produced is salted out by means of common salt. The dyestuff dyes cotton yellow-brown tints of excellent fastness to light.

A similar dyestuff is obtained from the secondary condensation product derived from 1 molecular proportion of cyanuric chloride, 1 molecular proportion of 2-amino-5-hydroxynaphthalene-7-sulfonic acid and 1 molecular proportion of 4'-amino-azobenzene-4-hydroxy-3-carboxylic acid.

Instead of 4'-amino-azobenzene-4-hydroxy-3-carboxylic acid similar mono-azo-dyestuffs can be used, such for example as 3'-amino-azobenzene-4-hydroxy-3-carboxylic acid, 4'-amino-azobenzene-3-methyl-4-hydroxy-3-carboxylic acid, and the corresponding dyestuffs which derive from the ortho-cresotinic acid or the 1:2- or 2:3-hydroxynaphthoic acids.

What I claim is:—

1. As new articles of manufacture the azo-dyestuffs containing complex bound metals which, on the one hand, correspond to the azo-dyestuffs of the general formula

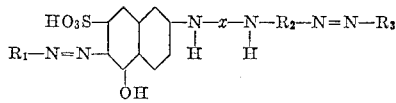

wherein $x$ stands for an organic residue containing at least one carbon atom, the

groups being linked to such carbon atoms of said residue which are united by a double bond with a nitrogen, oxygen or sulfur atom, and wherein $R_1$ means the residue of a benzene nucleus characterized by the presence of a COOR-group (R=H or alkyl) standing in ortho-position to the —N=N— group, $R_2$ is an aryl nucleus, and $R_3$ an aryl nucleus which carries a carboxyl group and a OH-group standing in ortho-position to each other, and which, on the other hand, contain complex bound metals of the atomic weight ranging between 52.1 and 63.6, which products form dark powders dyeing the vegetable fiber yellow-brown to orange reddish-brown tints.

2. As new articles of manufacture the azo-dyestuffs containing complex bound copper corresponding to the azo-dyestuffs of the general formula

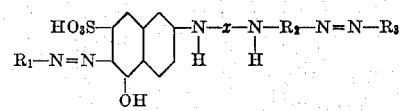

wherein $x$ stands for an organic residue containing at least one carbon atom, the

groups being linked to such carbon atoms of said residue which are united by a double bond with a nitrogen, oxygen or sulfur atom, and wherein $R_1$ means the residue of a benzene nucleus characterized by the presence of a COOR-group (R=H or alkyl) standing in ortho-position to the —N=N— group, $R_2$ is an aryl nucleus, and $R_3$ an aryl nucleus which carries a carboxyl group and a OH-group standing in ortho-position to each other, which products form dark powders dyeing the vegetable fiber yellow-brown to orange reddish-brown tints.

3. As new articles of manufacture the azo-dyestuffs containing complex bound copper which correspond to the azo-dyestuffs of the general formula

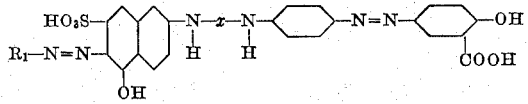

wherein $x$ stands for an organic residue containing at least one carbon atom, the

groups being linked to such carbon atoms of said residue which are united by a double bond with a nitrogen, oxygen or sulfur atom, and wherein $R_1$ is an aryl nucleus which carries a carboxyl group in ortho-position to the —N=N— group, which products form dark powders dyeing the animal fiber yellow-brown to orange tints of excellent fastness to light.

4. As new dyestuffs the copper compounds corresponding to the azo-dyestuffs of the general formula

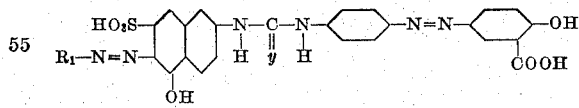

wherein $y$ means O or S and $R_1$ is an aryl nucleus which carries a corboxyl group in ortho-position to the —N=N— group, which products form dark brown powders dyeing cotton light brown tints which are very fast to light.

5. As a new product the copper compound corresponding to the azo-dyestuff of the formula

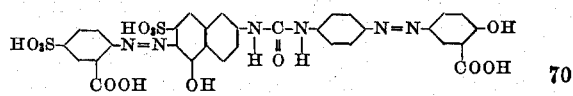

which product forms a dark brown powder dyeing cotton light brown tints which have excellent fastness properties to light.

6. The material dyed with the products of claim 1.

7. The material dyed with the products of claim 2.

8. The material dyed with the products of claim 3.

9. The material dyed with the products of claim 4.

10. The material dyed with the product of claim 5.

In witness whereof I have hereunto signed my name this 28th day of June, 1929.

HANS GUBLER.